(No Model.)

W. B. WERT.
PUMP PISTON.

No. 248,370. Patented Oct. 18, 1881.

Witnesses:
C. W. Nicholas,
A. C. Guthrie,

Inventor:
William B. Wert,
By Thomas G. Orwig, Att'y.

United States Patent Office.

WILLIAM B. WERT, OF KELLOGG, ASSIGNOR OF TWO-THIRDS TO DAVID Y. LYTLE, OF NEWTON, IOWA.

PUMP-PISTON.

SPECIFICATION forming part of Letters Patent No. 248,370, dated October 18, 1881.

Application filed March 23, 1881. (No model.)

*To all whom it may concern:*

Be it known that I, WILLIAM B. WERT, of Kellogg, in the county of Jasper and State of Iowa, have invented an Improved Pump Piston and Valve, of which the following is a specification.

The object of my invention is to provide a strong, durable, and expansible piston and valve that can be advantageously used in a common suction or lift pump to perform the function of a reciprocating piston or a stationary valve.

It consists in combining an expansible rubber ring and a flexible valve with a piston-head composed of a metal valve-seat, a metal washer, and a metal clamping device, as hereinafter fully set forth.

Figure 1:
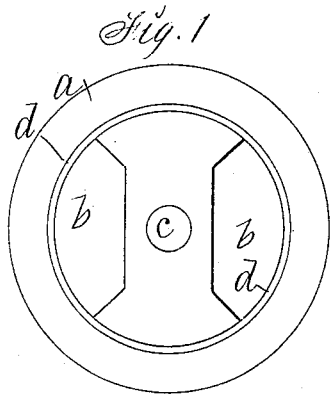
Figure 2:
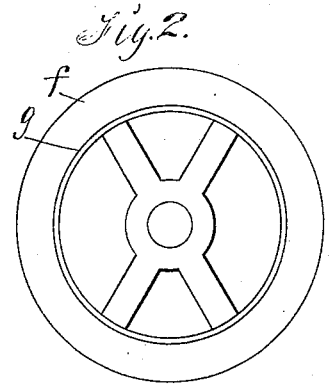
Figure 3:
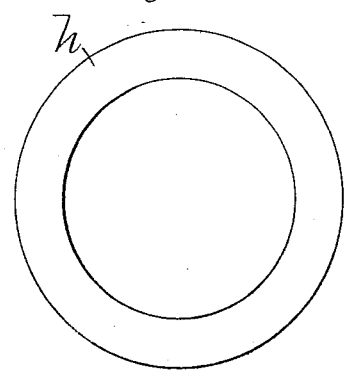
Figure 4:
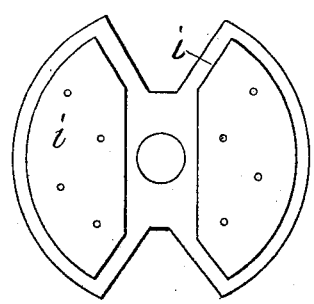
Figure 5:
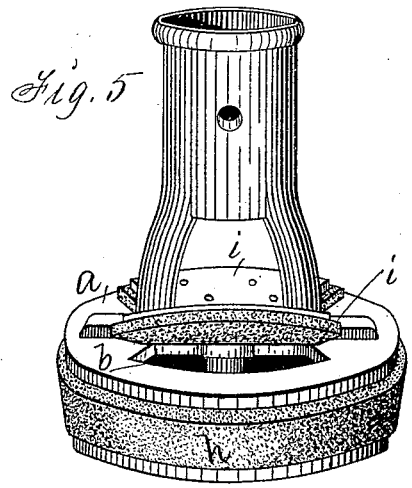
Figure 6:
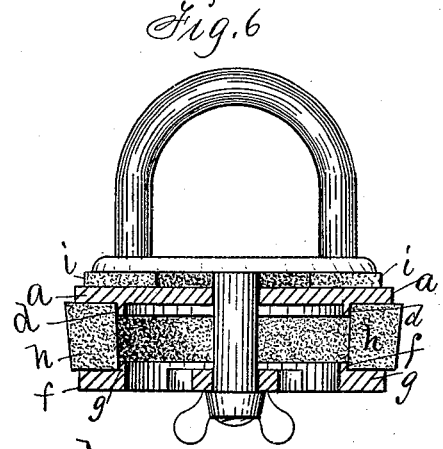

Figure 1 of my accompanying drawings is a view of the under side of a circular valve-seat. Fig. 2 is a top view of a washer-plate corresponding in size and form with the valve-seat. Fig. 3 is a top view of an expansible rubber ring. Fig. 4 is a top view of a butterfly-valve. Fig. 5 is a perspective view of my complete device, having a piston-rod socket attached to adapt it to be used as a piston. Fig. 6 is a half-section of the same, showing a loop attached to adapt it to be used advantageously as a stationary valve. Jointly considered, these figures clearly illustrate the construction, operation, and utility of my complete invention.

*a* is the metal valve-seat. It has openings *b* in its sides, a perforation, *c*, in its center, and an annular shoulder or flange, *d*, on its under side.

*f* is the washer-plate, that corresponds in form and size with the valve-seat *a*. It has an annular shoulder or flange, *g*, on its upper side.

*h* is a rubber ring, that may vary in thickness, as desired. Its inner edge corresponds in circumference with the flanges *d* and *g* on the metal plates, against which it is designed to abut, as shown in Fig. 6.

*i i* represent a butterfly-valve, such as I use in my pump-bucket patented August 16, 1881, No. 245,680. It is secured in its place on the valve-seat by means of a T-shaped clamping device, in the same manner that I secure the valve in the pump-bucket referred to.

To combine the rubber ring and flexible valve with the piston-head, composed of three rigid pieces that are preferably made of malleable iron, I simply place the ring between the valve-seat and the washer-plate, and the valve on top of the valve-seat, and then pass the screw-threaded end of the T-shaped clamping device down through their central perforations, and connect and clamp all the parts together by means of a thumb screw or nut, as shown in Fig. 6.

To expand the piston and valve circumferentially, as required, to compensate for wear and to fit tightly in the pump cylinder or bore, I simply draw the nut on the end of the clamping device.

To adapt my invention to be used as a piston, I form on or attach to the top of the T-shaped clamping device a piston-rod socket, as shown in Fig. 5, and to adapt it to be advantageously used as a stationary valve in the bore of the pump, I form on or fix to the same clamping device an eye or loop, as shown in Fig. 6, that will readily admit and engage a hook that may be introduced by means of a rod, rope, or chain, for the purpose of lifting the valve out of the pump whenever desired.

I claim as my invention—

The improved hollow piston and valve composed of the following elements, to wit: the valve-seat *a b c d*, the washer-plate *f g*, the rubber ring *h*, the butterfly-valve *i i*, and a T-shaped clamping device, substantially as shown and described, to be operated in the manner specified.

WILLIAM B. WERT.

Witnesses:
THOMAS G. ORWIG,
DAVID Y. LYTLE.